United States Patent [19]

Kruse et al.

[11] Patent Number: 4,750,326
[45] Date of Patent: Jun. 14, 1988

[54] FLEXIBLE BAFFLE FOR DAMPING FLOW OSCILLATIONS

[75] Inventors: Robert B. Kruse; Benjamin B. Stokes, both of Huntsville, Ala.; Robert L. Glick, Dayton, Ohio; Kenneth E. Junior, Madison, Ala.

[73] Assignee: Morton Thiokol, Inc., Chicago, Ill.

[21] Appl. No.: 3,422

[22] Filed: Jan. 14, 1987

[51] Int. Cl.⁴ .................................................. F02K 9/10
[52] U.S. Cl. ........................................ 60/253; 181/213
[58] Field of Search ................... 89/1.8; 102/287, 289, 102/292, 293, 374; 138/39, 40, 45, 46, 115, 116, 117; 149/2; 181/196, 197, 213, 219, 222, 227; 60/253, 254

[56] References Cited

U.S. PATENT DOCUMENTS

| | | | |
|---|---|---|---|
| 3,068,643 | 12/1962 | Camp | 60/253 |
| 3,548,863 | 12/1970 | Stippich | 138/117 X |
| 4,319,660 | 3/1982 | Bishop | 181/258 X |
| 4,429,634 | 2/1984 | Byrd et al. | 149/19.9 X |

OTHER PUBLICATIONS

McClure, et al., *Acoustic Resonance in Solid Propellant Rockets*, Journal of Applied Physics, pp. 884-896, May 1960.

*Primary Examiner*—Mark J. Thronson
*Attorney, Agent, or Firm*—Gerald K. White

[57] ABSTRACT

In solid propellant rocket motors the size of the flowfield defined by the bore continually increases as the solid propellant is consumed. As a result, the efficacy of a rigid baffle decreases through the burn. By making the baffle flexible, it can be deformed to fit the small initial geometry and its expansion due to inherent resilience naturally accommodates the enlarging geometry of the propellant bore. Since the baffle is flexible, it can participate in the oscillations and thereby alter frequency and mode structure and also introduce nonlinear behavior. Thus, pressure waves propagating in one direction around the propellant bore lift a flap of the baffle and pass through the clearance. Pressure waves propagating in the other direction around the bore, however, press the flap against the surface of the bore to restrict the passage of such waves. As a result, the flexible baffle acts as a "check valve" to limit wave motion. Anisotropic characteristics can be imparted to the baffle by incorporating stiffeners.

8 Claims, 5 Drawing Sheets

"PRIOR ART - FIGS. 2-5"
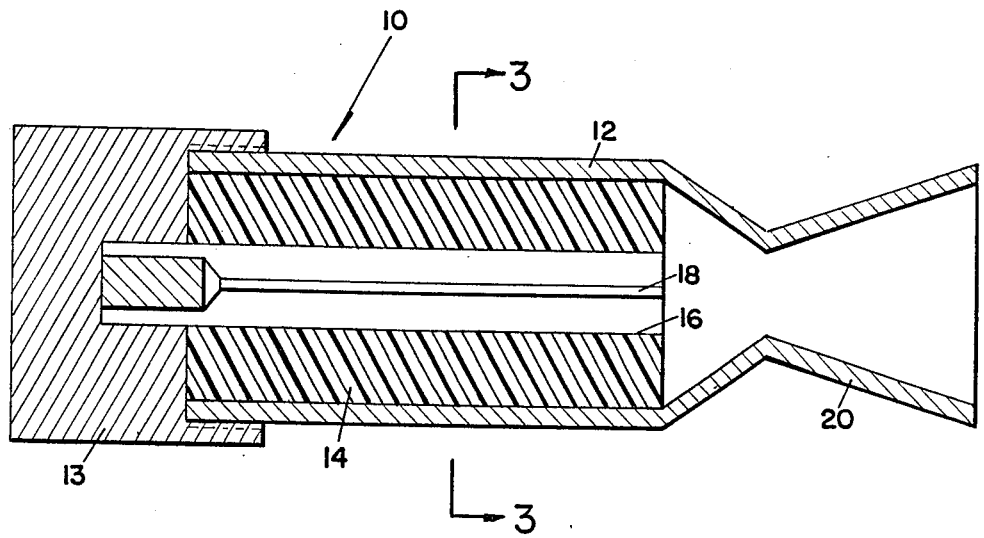
Fig. 2
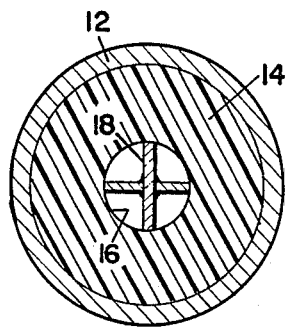     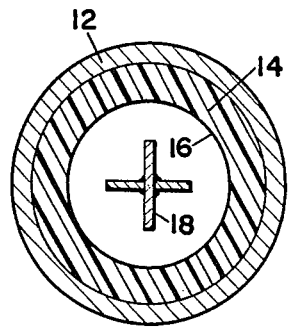     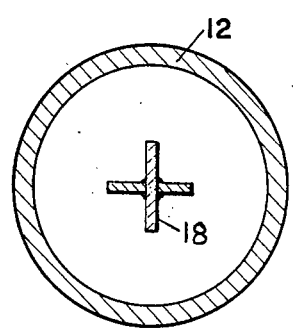
Fig. 3          Fig. 4          Fig. 5

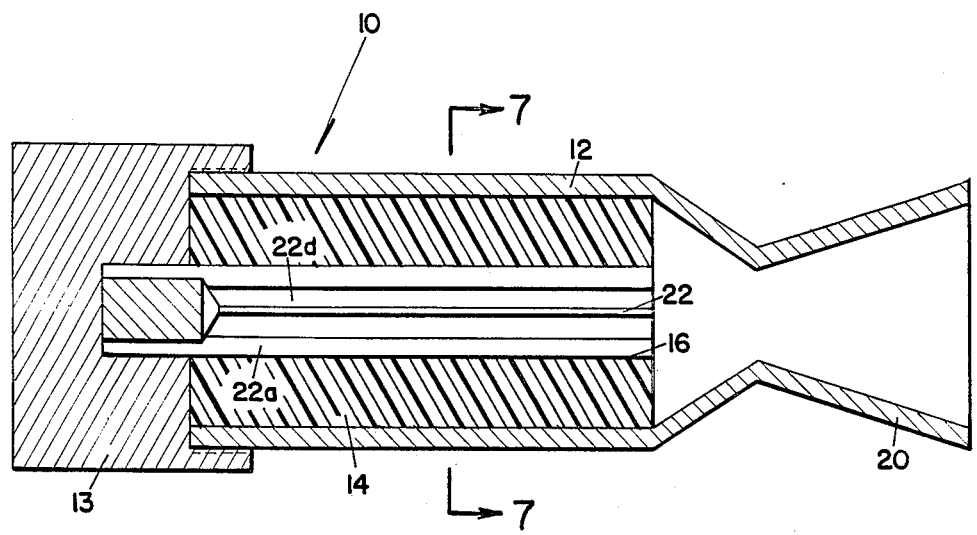
Fig. 6
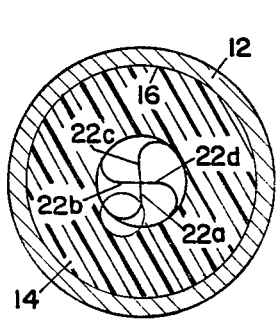 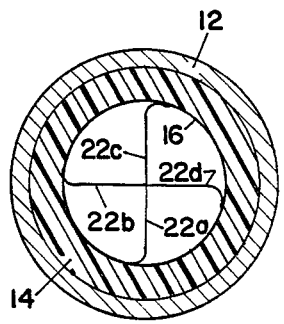 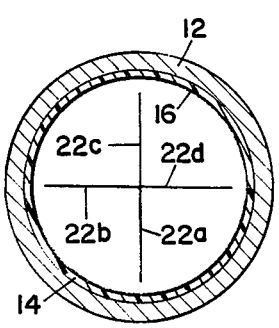
Fig. 7   Fig. 8   Fig. 9
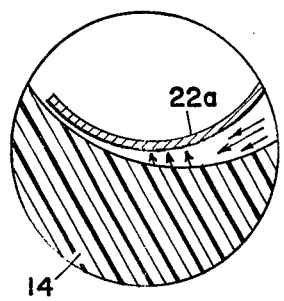
Fig. 10

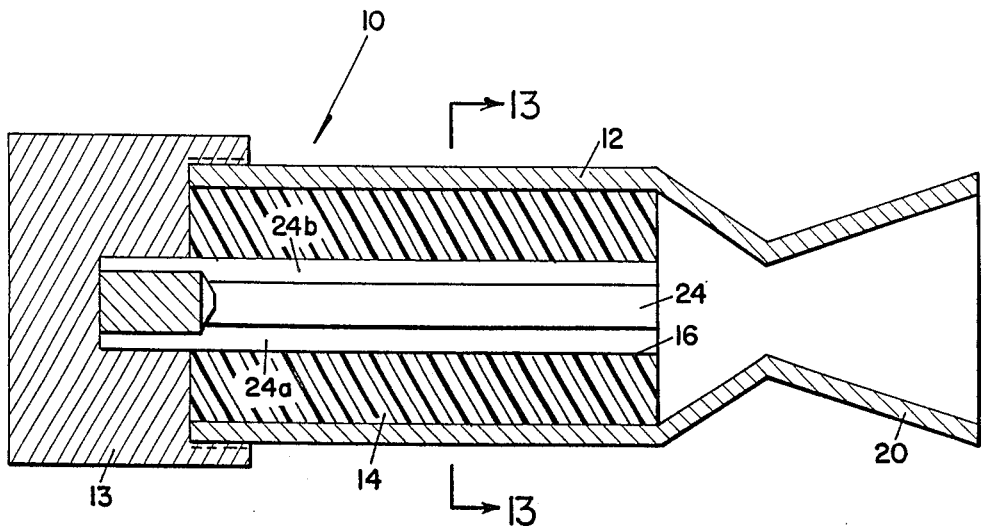
Fig. 12
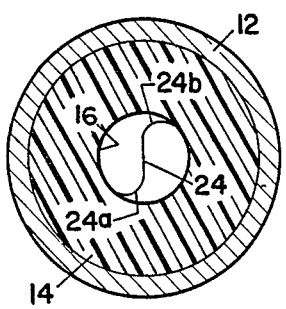  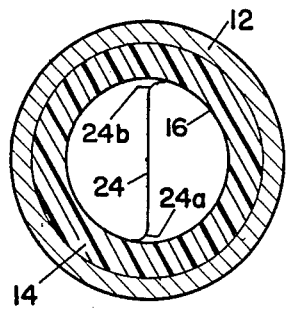  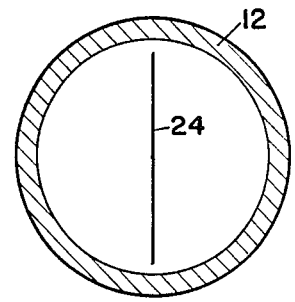
Fig. 13          Fig. 14          Fig. 15
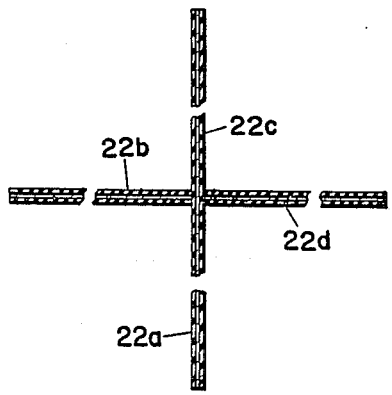
Fig. 11
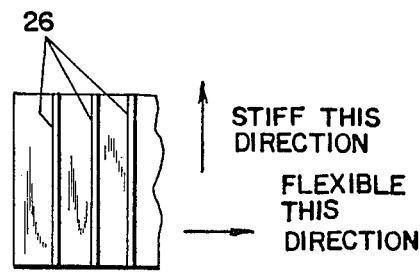
Fig. 17

FLEXIBLE BAFFLE FOR DAMPING FLOW OSCILLATIONS

BACKGROUND OF THE INVENTION

1. Field of the Invention

This invention relates particularly to solid propellant rocket motors but has utility in any flow system experiencing undesired flow oscillations.

2. Description of the Prior Art

Baffles or resonance suppressors in rigid form have been widely applied to reduce and/or eliminate flow oscillations. Rigid baffles are useful where the field of flow remains substantially constant, as in automobile mufflers. Where the field of flow changes, however, as for example, in the bore of a solid propellant rocket motor due to propellant deflagration, the application of rigid baffles is limited. This is because the size of a rigid baffle is fixed while the size of the bore in the solid propellant, and hence, that of the oscillating flow field, increases as the propellant is consumed. As a result, the baffle becomes less and less effective. Since the volume fraction, that is, the initial volume of the propellant divided by the volume of the motor, of a well designed solid propellant rocket motor is near unity, the problem of reducing and/or eliminating flow oscillations over the range of flow field variation in such motors has defied solution in the prior art.

Thus, there exists a need and a demand for improvement in baffles as applied to solid propellant rocket motors and other flow systems where the flow field does not remain constant but is of increasing size. The present invention was devised to fill the technological gap that has existed in this respect.

SUMMARY OF THE INVENTION

A general object of the invention is to provide, for damping oscillations in a flow field of increasing size, apparatus comprising a flexible baffle that can be deformed to fit into an initially small flow field and that expands to its undeformed shape as the flow field increases in size and thereby is operative at substantially maximum effectiveness over the range of flow field size variation.

A specific object of the invention is to provide such a flexible baffle for damping flow oscillations in the bore of a solid propellant rocket motor, which baffle remains at maximum effectiveness as the propellant is consumed.

Another specific object of the invention is to provide such an improved baffle which minimizes both inert weight and heat losses in a solid propellant rocket motor.

In accomplishing these and other objectives of the invention, there is provided a flexible, that is, resilient baffle or barrier comprising a polyisoprene rubber covered steel shim that can be deformed to fit into the small initial flow field space of the bore of the propellant grain of an internal burning propellant rocket motor and which will fit into the enlarging flow field space of the bore of the propellant grain as the bore increases in size due to propellant deflagration, simply by returning to its initial shape.

The various features of novelty which characterize the invention are pointed out with particularity in the claims annexed to and forming a part of this specification. For a better understanding of the invention, its operating advantages, and specific objects attained by its use, reference is made to the accompanying drawings and descriptive matter in which preferred embodiments of the invention are illustrated.

BRIEF DESCRIPTION OF THE DRAWINGS

With this description of the invention, a detailed description follows with reference being made to the accompanying figures of drawing which form part of the specification, in which like parts are designated by the same reference numbers, and of which:

FIG. 2 is a cross sectional view illustrating a prior art rigid cruciform baffle positioned in the bore of a solid propellant rocket motor for reducing flow oscillations therein;

FIG. 3 is a cross sectional view taken along the lines 3—3 of FIG. 2;

FIG. 4 is a cross sectional view similar to FIG. 3 showing the solid propellant as having been partially consumed;

FIG. 5 is a cross sectional view similar to FIGS. 3 and 4 showing the solid propellant as having been substantially completely consumed;

FIG. 6 is a cross sectional view illustrating a flexible baffle, according to a first embodiment of the present invention, positioned in the bore of a solid propellant rocket motor;

FIG. 7 is a cross sectional view taken along the lines 7—7 of FIG. 6;

FIG. 8 is a cross sectional view similar to FIG. 7 showing the solid propellant as having been partially consumed;

FIG. 9 is a cross sectional view similar to FIGS. 7 and 8 showing the solid propellant as having been substantially completely consumed;

FIG. 10 is a view on an enlarged scale of an encircled portion of the cross sectional view of FIG. 7;

FIG. 11 is an enlarged cross sectional view of the flexible baffle of FIGS. 6–10;

FIG. 12 is a cross sectional view illustrating a flexible baffle, according to a second embodiment of the invention, positioned in the bore of a solid propellant rocket motor;

FIG. 13 is a cross sectional view taken along the lines 13—13 of FIG. 12;

FIG. 14 is a cross sectional view similar to FIG. 13 showing the solid propellant as having been partially consumed.

FIG. 15 is a cross sectional view similar to FIGS. 13 and 14 showing the solid propellant as having been substantially completely consumed;

FIG. 17 illustrates the impartation of anisotropic properties to the flexible baffles of FIGS. 6 and 12 by incorporating stiffeners therein.

DESCRIPTION OF THE PRIOR ART

Figure 1:
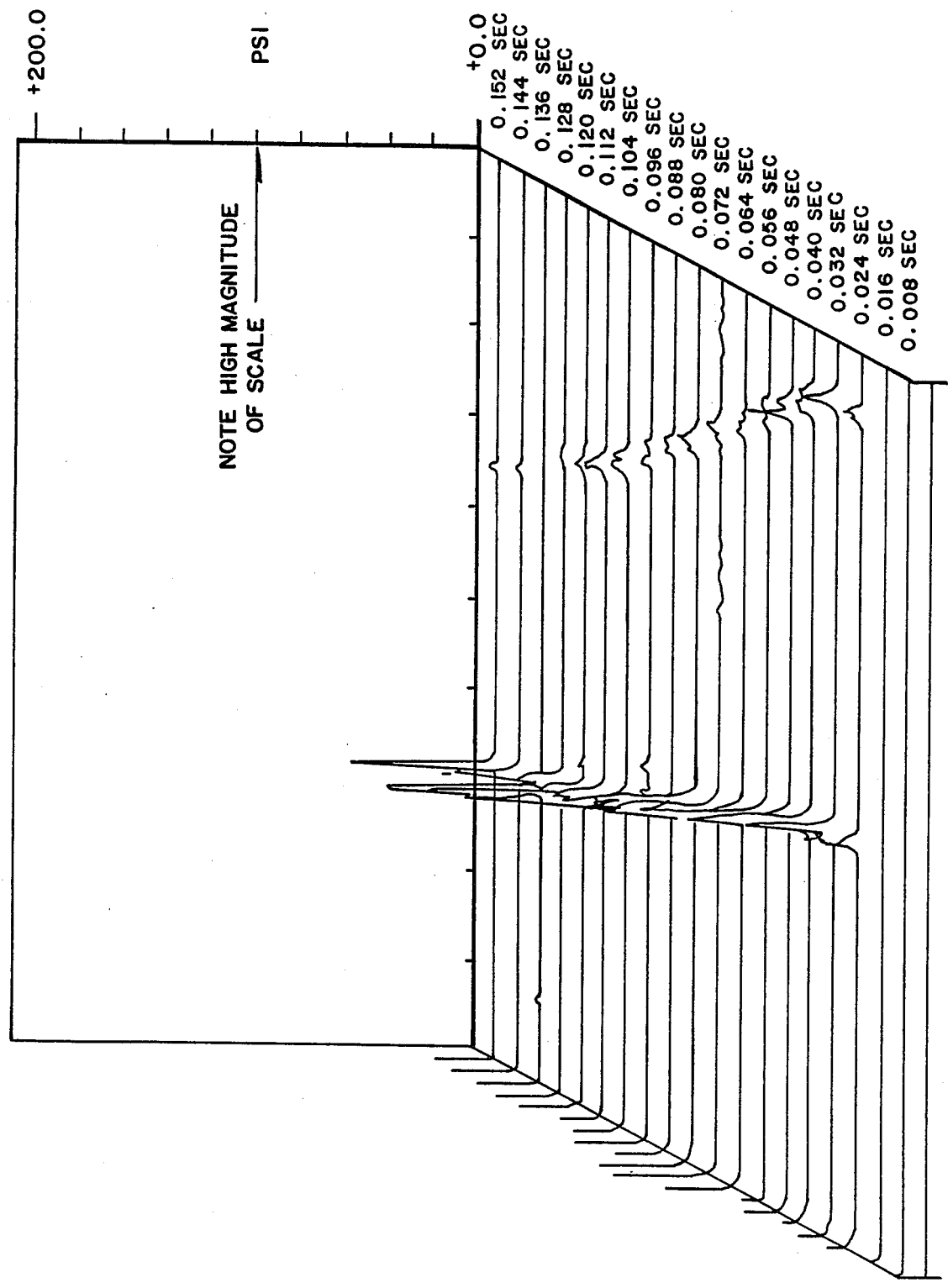
FIG. 1 is an acoustic spectrogram illustrating the character of flow oscillations encountered in the bore of a solid propellant rocket motor.

During the characterization of a solid propellant in a standard ballistic test motor, strong transverse mode flow pressure oscillations were encountered. These oscillations cast doubt on the validity of the rate data, and consequently, needed to be substantially reduced or completely eliminated. FIG. 1 is an acoustic spectrogram that illustrates the character of these oscillations, specifically high frequency of about 25 KHz and high amplitude of about 200 psi peak-to-peak.

Ballistic test motors are employed to evaluate certain solid rocket motor propellant characteristics, specifically the burn rate of the solid propellant and the effects of pressure and temperature on the burn rate. Embodiments of such ballistic test motors are disclosed in the copending application for U.S. Patent bearing Ser. No. 853,588, on Apr. 18, 1986 by Rexford D. Atchley et al. and assigned to the assignee of the present invention. The disclosure of that application, by reference, is made a part hereof.

In an attempt to reduce the flow oscillations encountered in the ballistic test motor, as described above, a rigid cruciform baffle, as known in the prior art and as illustrated in FIGS. 2-5, was tested. In FIG. 2 the numeral 10 generally designates a solid propellant ballistic test motor having an outer cylindrical case 12 that is closed by a removable closure 13 at the forward end. Motor 10 includes a case bonded internal burning propellant grain 14 having an elongated cylindrical bore or port 16 therein. Positioned within the bore 16 is an elongated rigid cruciform baffle 18 for damping the flow oscillations in the motor 10. The forward end of baffle 18 is rigidly attached in any suitable manner by means (not shown) to the closure 13. At a position aft thereof, the motor 10 includes a nozzle 20 of the convergent-divergent type. For igniting the propellant grain 14, a bag igniter (not shown) of known type may be placed at a suitable location within the bore 16.

Rigid baffle 18 is fixed in size. Before ignition of the propellant grain 14, baffle 18 fills the bore 16, as shown in FIGS. 2 and 3. Baffle 18 is then of a size that is most effective for damping flow oscillations in motor 10. However, as the propellant grain 14 is consumed following ignition due to deflagration, the diameter of bore 16 increases, as shown in FIGS. 4 and 5. This causes the baffle 18 to become less effective for damping flow oscillations in motor 10. The efficiency of the baffle 18 thus continually decreases through the burn of the solid propellant grain 14 and is ineffective to reduce the flow oscillations in motor 10 sufficiently to overcome the problem described above and encountered in the characterization of a solid propellant in a standard ballistic test motor.

DESCRIPTION OF PREFERRED EMBODIMENTS OF THE INVENTION

In accordance with a first embodiment of the invention, as illustrated in FIGS. 6-10, a solid propellant rocket motor 10, which may be identical to the motor 10 of FIG. 2, has incorporated therein an elongated flexible baffle 22. Baffle 22 is rigidly attached at the forward end thereof by any suitable means (not shown) to the closure 13 and has two pairs of coextensive and contiguous portions 22a, 22b and 22b, 22d that extend at a right angle to each other, as best seen in FIG. 11. At the forward end thereof the baffle 22 may be so shaped that each of the undeformed baffle portions 22a, 22c and 22b, 22d that is attached to the closure 13 is reduced in width to substantially the same extent such that the overall width thereof is no greater than the small initial diameter of bore 16. When baffle 22 is positioned in the small initial bore 16, the portions 22a, 22b, 22c and 22d are all deformed to form flap portions with the flaps all facing in the same direction around bore 16, as best seen in FIG. 7.

Baffle 22 may be made in any suitable manner of steel shim stock covered with a layer or coating of polyisoprene on both sides of each of the portions thereof. For example, each of the adjacent portions 22a, 22b and 22c, 22d may be made of a single elongated piece of steel shim stock folded transversely in a right angle at the middle and welded together at the fold line. Typically, the steel shim stock may be twenty thousandths of an inch (0.020 inches, 0.508 millimeters) thick and the polyisoprene coating may be thirty thousandths of an inch (0.030 inches, 0.774 millimeters) thick.

When undeformed, baffle 22, in cross section, has the shape of a cruciform or cross, as shown in FIGS. 9 and 11. Since baffle 22 is flexible, however, the combined transverse widths of the pairs of flaps 22a, 22c and 22b, 22d can be made larger than the small initial diameter of bore 16 (except at the point of attachment to closure 13) and deformed to fit therein, as shown in FIG. 7. Expansion or spreading out of the flaps 22a, 22c and 22b, 22d of baffle 22 due to the inherent resilience thereof naturally accommodates the enlarging diameter of the bore 16 as the solid propellant grain 14 is consumed during the burning thereof.

It will be noted that collectively the baffle portions 22a, 22c and 22b, 22d each form an "S" when the baffle 22 is deformed to fit into the small initial bore 16 of propellant grain 14. FIGS. 7 and 8 illustrate this important aspect of the invention. FIG. 8 shows the solid propellant grain 14 as having been partially consumed, thus enlarging the diameter of the bore 16. FIG. 9 shows the solid propellant grain 14 as being nearly completely consumed, resulting in further enlargement of the diameter of bore 16 in the propellant grain 14. In FIG. 9 it will be seen that the baffle 22 has returned, due to the resilience thereof, to its initial, undeformed shape.

Another feature of the invention, stemming also from the flexibility of the baffle 22, is that the baffle 22 can participate in flow oscillations in the bore 16 of motor 10 and thereby alter the frequency and mode structure of the flow oscillations. A rigid baffle is incapable of such participation. Moreover, because baffle 22 is deformed and is deformable by oscillatory pressure forces, nonlinear behavior, specifically rectification, can be introduced. Thus, as shown in the encircled portion of the cross sectional view of FIG. 7 and as best seen in the enlarged view of that encircled portion shown in FIG. 10, pressure waves propagating clockwise in bore 16 will lift the flap 22a and pass through the clearance space. Pressure waves propagating counterclockwise will press the flap 22a against the surface of the solid propellant grain 14 and thereby restrict the passage of such pressure waves. Thus the flexible baffle 22 acts as a "check valve" to limit oscillating flow wave motion in bore 16.

In a second embodiment of the invention, as illustrated in FIGS. 12-15, a solid propellant rocket motor 10, which also may be identical to the motor 10 of FIG. 2, has incorporated in the bore 16 thereof a deformable elongated baffle 24. At the forward end thereof the baffle 24 is rigidly attached by a central undeformed portion thereof to the closure 13 in any suitable manner by means (not shown) with the width of the baffle portion attached to closure 13 being no greater than the diameter of bore 16.

Baffle 24 comprises a single elongated flat strip having an "S" shape in cross section when deformed and placed in the small initial bore 16 of motor 10, as shown in FIG. 12. The strip 24, may be made of steel shim stock, typically twenty thousandths of an inch thick with a layer of polyisoprene thirty thousandths of an inch thick on both sides.

When undeformed, baffle 24 is flat, as seen in FIG. 15. Since baffle 24 is flexible, however, the width thereof may be made larger than the initial small diameter of bore 16 and deformed in the shape of an "S" in cross section to fit therein. With flexible baffle 24 so deformed, as shown in FIGS. 13 and 14, there are provided transverse flaps 24a and 24b that are in engagement with the inner surface of the bore 16 of propellant grain 14, at diametrically opposite sides of bore 16.

Expansion or spreading out of the baffle 24 accommodates the enlarging geometry of the bore 16 as the solid propellant grain 14 is consumed during burning thereof. Thus, FIG. 14 shows the solid propellant grain 14 as having been partially consumed and with the baffle 24 as partially expanded from the "S" shape thereof shown in FIG. 13. FIG. 15 shows the solid propellant grain 14 as having been substantially completely consumed with the baffle 24 completely expanded to its flat shape. Thus, the "S" shape of the baffle 24 flattens out as the propellant burns. As those skilled in the art will understand, the width of the baffle 24 may be so selected as to retain more or less of the "S" shape, when the propellant grain 14 is completely burned, than is illustrated in FIG. 15.

Similarly to the baffle 22 of FIGS. 6–10, it is noted that the baffle 24 of FIGS. 12–15 can also participate in flow oscillations in the bore 16 of motor 10 for effecting alteration of the frequency and mode structure of the flow oscillations. Also, because baffle 24 is deformed and is deformable by oscillatory pressure forces, nonlinear behavior or rectification can be introduced thereby. Thus, by reference to FIGS. 13 and 14, pressure waves propagating clockwise in bore 16 will lift the transverse flaps 24a and 24b of the baffle 24 out of engagement with the surface of the propellant grain 14 at the interface with bore 16 and pass through the clearance space. Pressure waves propagating counterclockwise will press the transverse flaps 24a and 24b of the baffle 24 against the surface of the propellant grain 14 and restrict the passage of such pressure waves. The baffle 24, similarly to the baffle 22, thus acts as a "check valve" to limit oscillating flow wave motion.

Figure 16:
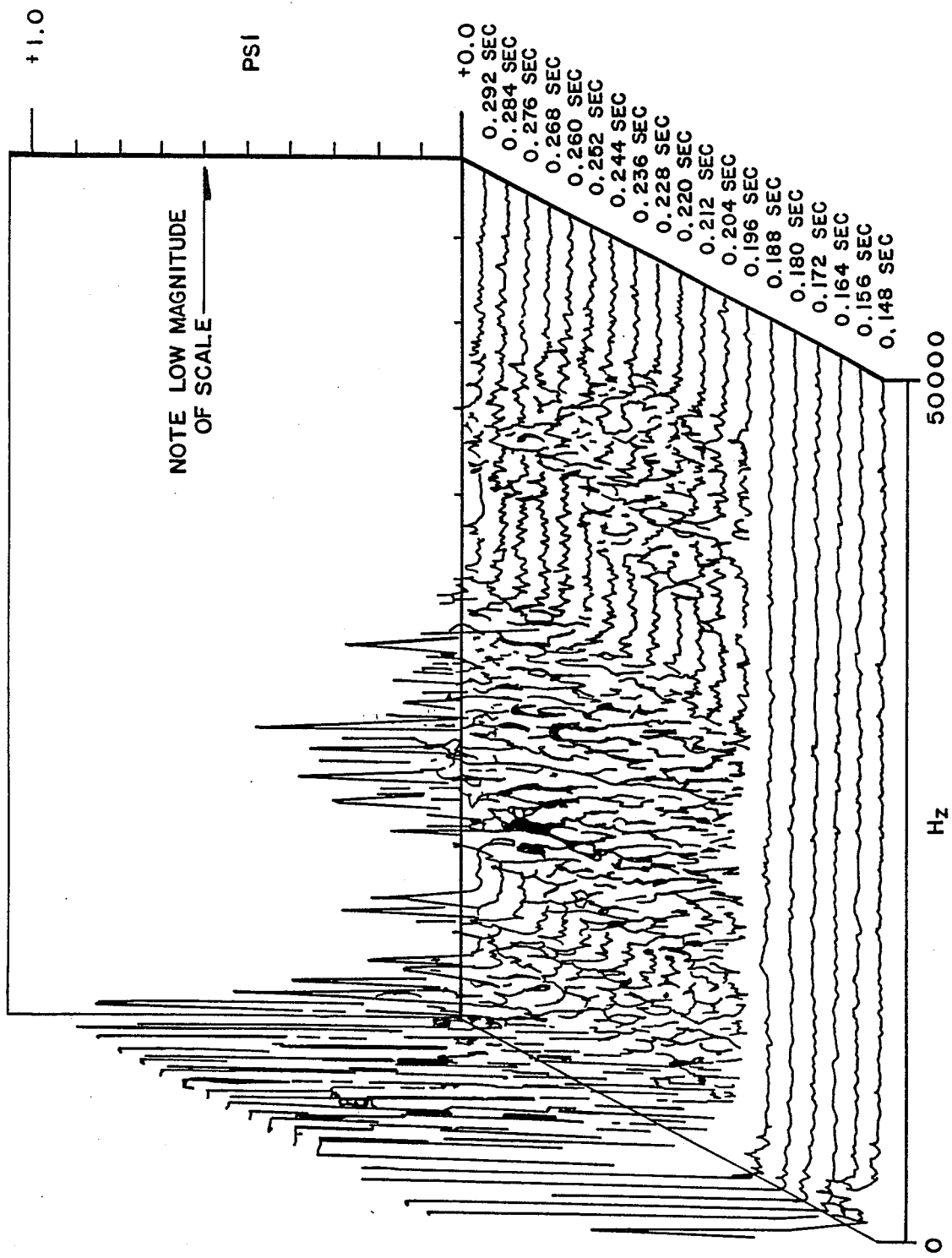
FIG. 16 is an acoustic spectrogram illustrating the character of flow oscillations produced in the bore of a solid propellant rocket motor with a baffle according to the present invention placed therein.

A flexible, polyisoprene rubber covered steel shim stock baffle such as the baffle 24 described herein was tested in a standard ballistic test motor. It completely eliminated the high frequency oscillations, and substantially reduced the low frequency oscillations, as shown by the acoustic spectrogram of FIG. 16. That the baffle 24 greatly reduces the oscillations in the bore 16 of motor 10 over a frequency range of 0–50,000 Hz is readily apparent upon a comparison particularly of the high magnitude of the scale in the spectrogram of FIG. 1 with the low magnitude of the scale of the spectrogram of FIG. 16.

Anisotropic characteristics can be imparted to the baffle 22 of the first embodiment of the invention and to the baffle 24 of the second embodiment of the invention by incorporating stiffeners therein, as illustrated in FIG. 17. Specifically, as shown in FIG. 17, a plurality of stiffeners 26 arranged in spaced parallel relation may be suitably attached to the steel shim stock of which the baffles are formed with the arrangement being such that the stiffeners run generally parallel to the axis of the bore 16 and the edges of the portion or flap pairs 22a, 22c and 22b, 22d of baffle 22.

Thus, in accordance with the invention, there has been provided an improvement in baffles for reducing or eliminating oscillations in the bores of solid propellant rocket motors and other flow systems where the flow field does not remain constant but is of increasing size. The improved baffle of the invention is characterized in that it is operative at substantially maximum effectiveness over the entire range of flow field size variation.

The problem of flow oscillations has long existed. Because baffles are inert, they decrease the mass fraction of a solid propellant rocket motor thereby degrading its performance if deleterious flow oscillations are not present. Consequently, since the presence of flow oscillations is not known until prototype testing is completed, baffles are not commonly incorporated into a design. Therefore, baffles represent a retrofit solution or "fix" to an unanticipated problem. The flexible baffle of the present invention is especially useful in that, since it can be deformed, it can literally be crammed into a motor exhibiting deleterious oscillations to solve that problem.

In rocket motor applications, it is also desirable to minimize both inert weight and heat losses. The use of the baffle according to the invention achieves both of these desirable objectives and makes the baffle of the invention uniquely different from large mass, metal baffles that have been employed in the prior art as "resonance rods" to suppress pressure oscillations in rocket motors.

With this description of the invention in detail, those skilled in the art will appreciate that modifications may be made to the invention without departing from the spirit thereof. Therefore, it is not intended that the scope of the invention be limited to the specific embodiment illustrated and described. Rather, it is intended that the scope of the invention be determined by the appended claims.

What is claimed is:

1. An internal burning solid propellant rocket motor, said motor having a forward end, an aft end, and a propellant grain, said propellant grain having a bore, said bore defining a small initial flow field space, said bore being capable of increasing in size due to propellant deflagration to thereby define an enlarging flow field space;

said motor comprising an apparatus for damping flow oscillations in said bore;

said apparatus comprising a flexible baffle, said baffle having a forward end and an aft end and having an initial shape of size large than said small initial flow field space, said baffle being deformable and thereby reducible in size from said initial shape to fit into said small initial flow field space, said baffle being fitted into said small initial flow field space, said baffle being capable of fitting into the enlarging flow field space as said bore increases in size due to propellant deflagration by returning to its initial shape, said baffle being rigidly attached at the forward end thereof to the forward end of the rocket motor.

2. An internal burning solid propellant rocket motor as defined by claim 1 wherein said baffle is made of steel shim stock.

3. An internal burning solid propellant rocket motor as defined by claim 1 wherein said baffle includes a plurality of flexible angularly displaced transverse portions that are deformable to form flaps when said baffle is positioned in said bore, with said flaps being in engagement with the surface of said bore and all facing in the same direction around said bore, whereby pressure waves propagating in one direction around said bore are operative to lift each of said flaps and pass through the resulting clearance spaces while pressure waves propagating in the other direction around said bore are operative to press said flaps against the surface of said bore and thereby restrict the passage of such pressure waves.

4. An internal burning solid propellant rocket motor as defined by claim 3 wherein said baffle includes stiffeners therein that introduce stiffness in a direction generally parallel to the axis of said bore thereby to impart anisotropic characteristics to said baffle.

5. An internal burning solid propellant rocket motor as defined by claim 3 wherein said baffle when undeformed comprises a flat strip and the cross section of which when deformed to fit into said bore is "S" shaped.

6. An internal burning solid propellant rocket motor as defined by claim 5, wherein said baffle is made of steel shim stock that is covered on both sides with a coating of polyisoprene.

7. An internal burning solid propellant rocket motor as defined by claim 1 wherein said baffle includes four transverse portions and when undeformed is cross shaped in cross section, each of said transverse portions when said baffle is positioned in said bore being deformable to form a flap in engagement with the surface of said bore with all of the flaps facing in the same direction around said bore whereby pressure waves propagating in one direction around said bore are operative to lift each of said flaps and pass through the resulting clearance spaces while pressure waves propagating in the other direction around said bore are operative to press said flaps against the surface of said bore and thereby restrict the passage of such pressure waves.

8. An internal burning solid propellant rocket motor as defined by claim 7 wherein the four transverse portions of said baffle are made of steel shim stock covered on both sides with a coating of polyisoprene.

* * * * *